United States Patent
Mazumder et al.

(10) Patent No.: US 8,020,397 B2
(45) Date of Patent: Sep. 20, 2011

(54) REDUCTION OF DILUENT NITROGEN COMPRESSOR POWER USING VAPOR ABSORPTION CHILLER

(75) Inventors: Indrajit Mazumder, Karnataka (IN); Rajarshi Saha, Karnataka (IN)

(73) Assignee: General Electric Company, Schenectady, NY (US)

(*) Notice: Subject to any disclaimer, the term of this patent is extended or adjusted under 35 U.S.C. 154(b) by 547 days.

(21) Appl. No.: 12/261,452

(22) Filed: Oct. 30, 2008

(65) Prior Publication Data

US 2010/0107662 A1    May 6, 2010

(51) Int. Cl.
*F25B 27/00*    (2006.01)
(52) U.S. Cl. ........................ 62/238.3; 62/101
(58) Field of Classification Search ............ 62/101, 62/238.3, 476
See application file for complete search history.

(56) References Cited

U.S. PATENT DOCUMENTS

| | | | |
|---|---|---|---|
| 5,555,738 A | 9/1996 | DeVault | |
| 6,058,695 A | 5/2000 | Ranasinghe et al. | |
| 6,170,263 B1 | 1/2001 | Chow et al. | |
| 6,216,436 B1 | 4/2001 | Ranasinghe et al. | |
| 6,769,266 B2 * | 8/2004 | Dodo et al. | 62/238.3 |
| 7,178,348 B2 | 2/2007 | Stuhlmueller | |
| 7,316,126 B2 * | 1/2008 | Aoyama et al. | 62/476 |

* cited by examiner

*Primary Examiner* — Melvin Jones
(74) *Attorney, Agent, or Firm* — Cantor Colburn LLP

(57) ABSTRACT

A diluent nitrogen compressor inlet cooling system comprises a bottoming cycle heat source; a vapor absorption chiller powered by the bottoming cycle heat source, the vapor absorption chiller being configured to cool diluent nitrogen; and a diluent nitrogen compressor that receives the cooled diluent nitrogen from the vapor absorption chiller. A method for cooling an inlet of a diluent nitrogen compressor comprises powering a vapor absorption chiller using a bottoming cycle heat source from the integrated gasification combined cycle system; indirectly cooling diluent nitrogen by the vapor absorption chiller; and sending the cooled diluent nitrogen to a diluent nitrogen compressor inlet.

12 Claims, 4 Drawing Sheets

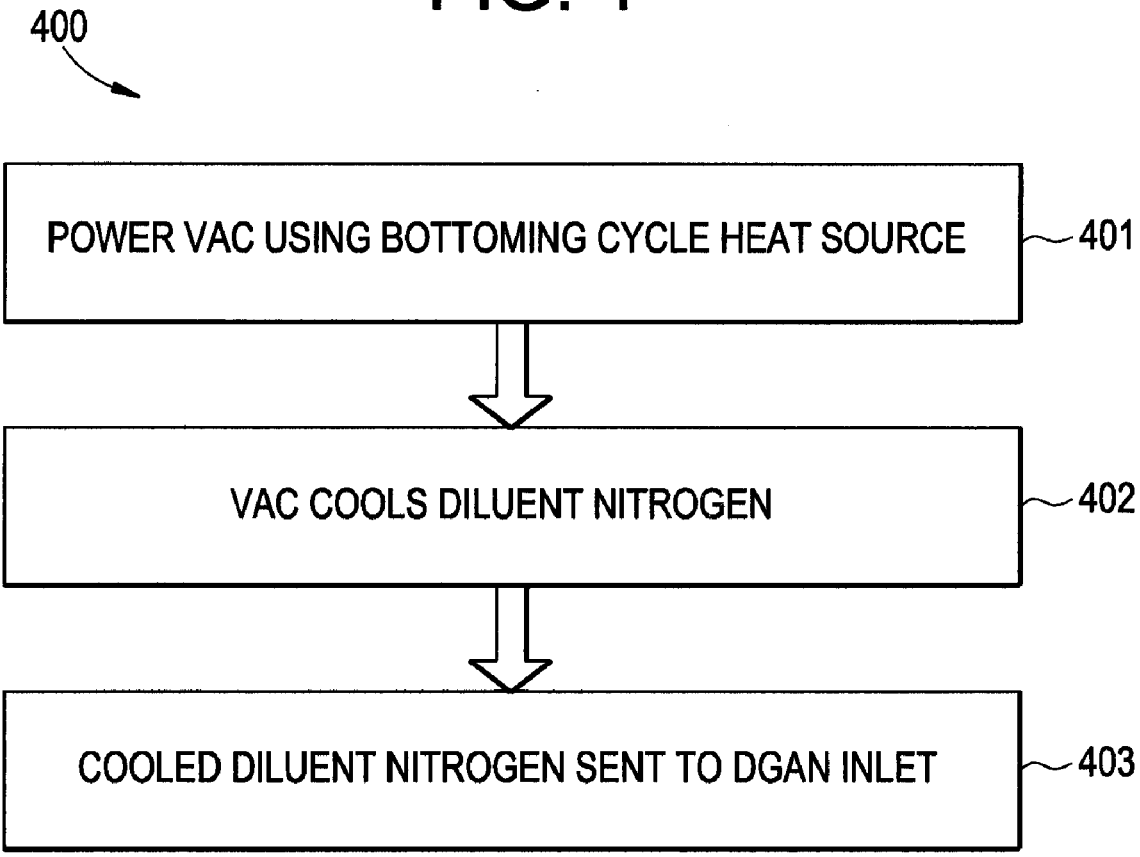

US 8,020,397 B2

REDUCTION OF DILUENT NITROGEN COMPRESSOR POWER USING VAPOR ABSORPTION CHILLER

BACKGROUND OF THE INVENTION

The subject matter disclosed herein relates to an improved integrated gasification combined cycle (IGCC) power plant.

An integrated gasification combined cycle (IGCC) power generating plant performs a two-stage combustion with cleanup between stages. The first stage includes a gasifier for partial oxidation of a fossil fuel, such as coal or heavy fuel oil, and the second stage utilizes a gas turbine combustor for burning the fuel gas produced by the gasifer. Performance of the gas turbine combustor is enhanced by the addition of compressed diluent nitrogen. Diluent nitrogen from an air separation unit (ASU) in the IGCC is compressed in stages by a diluent nitrogen compressor (DGAN) and inter-cooled between stages by a cooling tower water source. The compressed nitrogen is then supplied to the gas turbine combustor. The DGAN compressor consumes power as an auxiliary load. The DGAN compressor may consume a large amount of power, lowering the overall efficiency of the IGCC power plant.

Accordingly, there remains a need in the art for a reduction in the power load consumed by a DGAN compressor operated in conjunction with an IGCC power plant.

BRIEF DESCRIPTION OF THE INVENTION

According to one aspect of the invention, a diluent nitrogen compressor inlet cooling system comprises a bottoming cycle heat source; a vapor absorption chiller powered by the bottoming cycle heat source, the vapor absorption chiller being configured to cool diluent nitrogen; and a diluent nitrogen compressor that receives the cooled diluent nitrogen from the vapor absorption chiller.

According to another aspect of the invention, a method for cooling an inlet of a diluent nitrogen compressor comprises powering a vapor absorption chiller using a bottoming cycle heat source from the integrated gasification combined cycle system; indirectly cooling diluent nitrogen by the vapor absorption chiller; and sending the cooled diluent nitrogen to a diluent nitrogen compressor inlet.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 4 is an embodiment of a method of cooling nitrogen supplied to a DGAN compressor inlet.

The detailed description explains embodiments of the invention, together with advantages and features, by way of example with reference to the drawings.

DETAILED DESCRIPTION OF THE INVENTION

DGAN power consumption is directly proportional to DGAN compressor inlet temperature. For a given mass flow, the power consumption of the DGAN compressor is higher at a higher temperature; the density of nitrogen decreases as temperature rises, requiring more compression. Cooling the inlet nitrogen temperature results in denser nitrogen, requiring less compression, reducing DGAN compressor power consumption. For example, power consumption of a DGAN compressor power may be reduced by about 2 MW by a reduction of the inlet temperature of about 40° F.

Low grade or waste heat from the bottoming cycle of the IGCC power plant may be used to run a vapor absorption chiller (VAC) system. The VAC may generate a chilling media to cool the nitrogen before it reaches the inlet of the DGAN compressor. Cooling reduces the volumetric flow through the compressor, resulting in reduction of compressor work. Thus the plant auxiliary load is reduced, resulting in an output gain of approximately 1 MW to 1.8 MW and a net efficiency gain of approximately 0.08%-0.12% for embodiments of an IGCC power plant.

Figure 1:
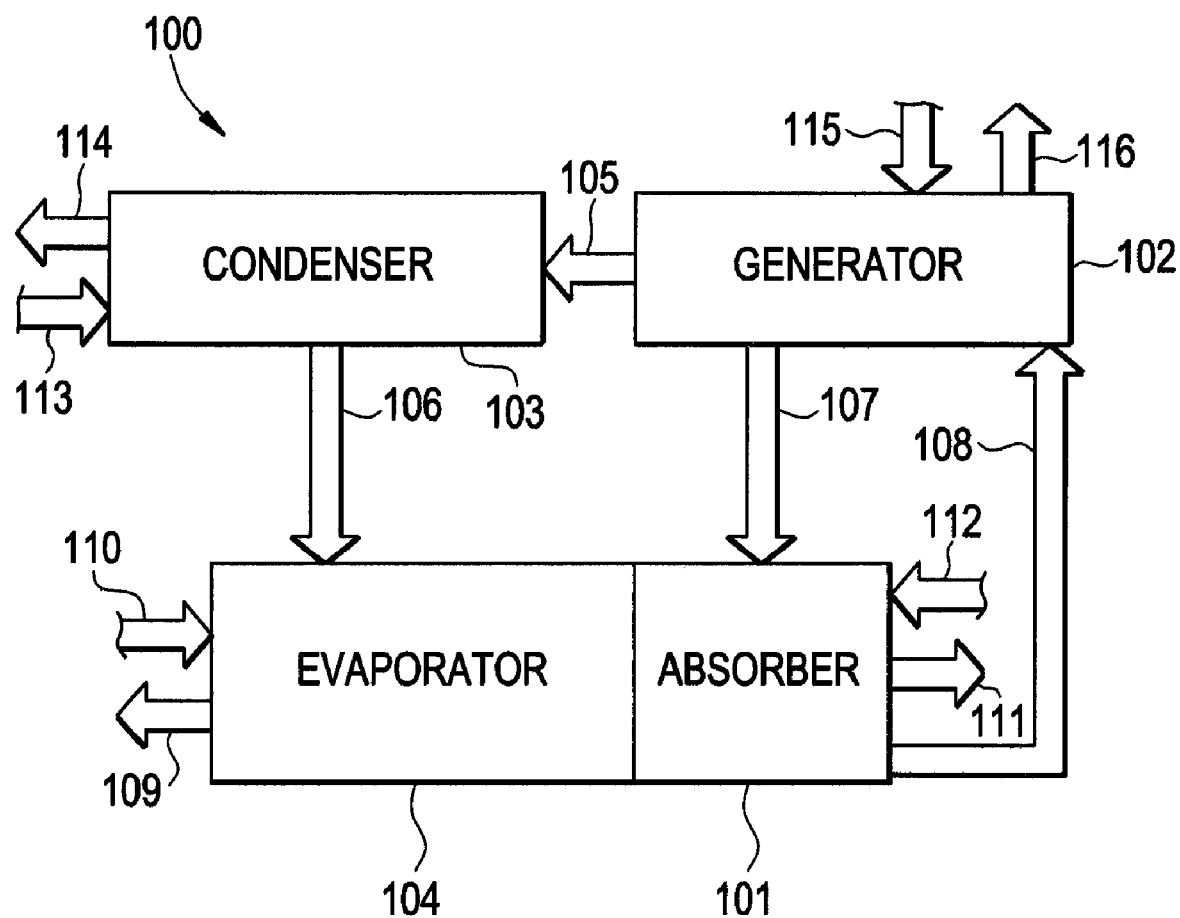
FIG. 1 is an embodiment of a vapor absorption chiller (VAC).

FIG. 1 shows an embodiment of a vapor absorption chiller (VAC) 100. VAC 100 comprises four sections: absorber 101, generator 102, condenser 103, and evaporator 104. Evaporator 104 is kept at a low pressure, or vacuum. The vacuum in evaporator 104 causes a refrigerant, such as ammonia ($NH_3$), to boil at very low temperature; the boiling refrigerant absorbs heat from a cooling media that is circulated to and from the evaporator 104 via pipes 109 and 110. The heat transfer between the cooling media and the refrigerant converts the refrigerant into a vapor. The refrigerant vapor is sent to absorber 101. In absorber 101, the refrigerant vapor is absorbed into water. The refrigerant-enriched water is pumped from absorber 101 to generator 102 via pipe 108. Heat from a bottoming cycle heat source in the form of hot water or steam is received by generator 102 via pipe 115, and water or steam at a reduced temperature is output from the generator 102 via pipe 116. The heat from the hot water or steam in pipe 115 is transferred to the refrigerant-enriched water from pipe 108 in generator 102. The heat from the hot water or steam from pipe 115 boils the refrigerant off from the refrigerant-enriched water received from pipe 108, resulting in refrigerant vapor and hot water. The hot water is sent to the absorber via pipe 107. Excess heat is removed from the hot water in absorber 101 by cooling water flow from a cooling tower, circulated via pipes 111 and 112. The refrigerant vapor from the generator 102 is sent to condenser 103 via pipe 105, where it is converted to a liquid by exchanging heat with cool water from a cooling tower, circulated via pipes 113 and 114. The liquid refrigerant is then sent to back the vacuum in the evaporator 104 via pipe 106, where it absorbs heat from the cooling media circulating in pipes 109 and 110. The cooling media circulates via pipes 109 and 110 between evaporator 104 and a nitrogen chiller, which is discussed below with regards to FIGS. 2 and 3.

The heat source that powers the VAC 100 may be selected so as not to affect the overall performance of the IGCC power plant. Any bottoming cycle heat source in the IGCC power plant that has sufficient flow, pressure, and temperature for proper operation of the VAC 100 may be selected. Three examples of bottoming cycle heat sources in the IGCC power plant that may be used to power VAC 100 include: stack flue gas heat, steam from a steam seal regulator (SSR), or evaporator blow down flow.

Stack flue gas may be used to heat water. In some embodiments, a low pressure economizer (LPE) may heat the water using the stack flue gas. The heated water may be used to power VAC 100. Water heated using stack flue gas may reach a temperature of about 160° F. and a pressure of about 14.7 psi.

Steam comes from an SSR outlet at about 600° F. and about 20 psi pressure. This steam may also be used to power VAC 100 in some embodiments. The VAC 100 may require a minimum of about 21 psi pressure to operate, so the steam pressure may be increased to about 25 psi by using a steam compressor. The steam compressor will increase the steam temperature to about 665° F. The steam is condensed in the VAC and is discharged to a gland seal condenser (GSC) as water at a temperature of about 240° F. The water may be used in the GSC for pre-heating condensate, or may by-pass the GSC if pre-heating is not necessary for the particular IGCC power plant.

Water comes from the evaporator blow down flow at about 200° F. This water may also be harnessed to run VAC 100 in some embodiments.

Figure 2:
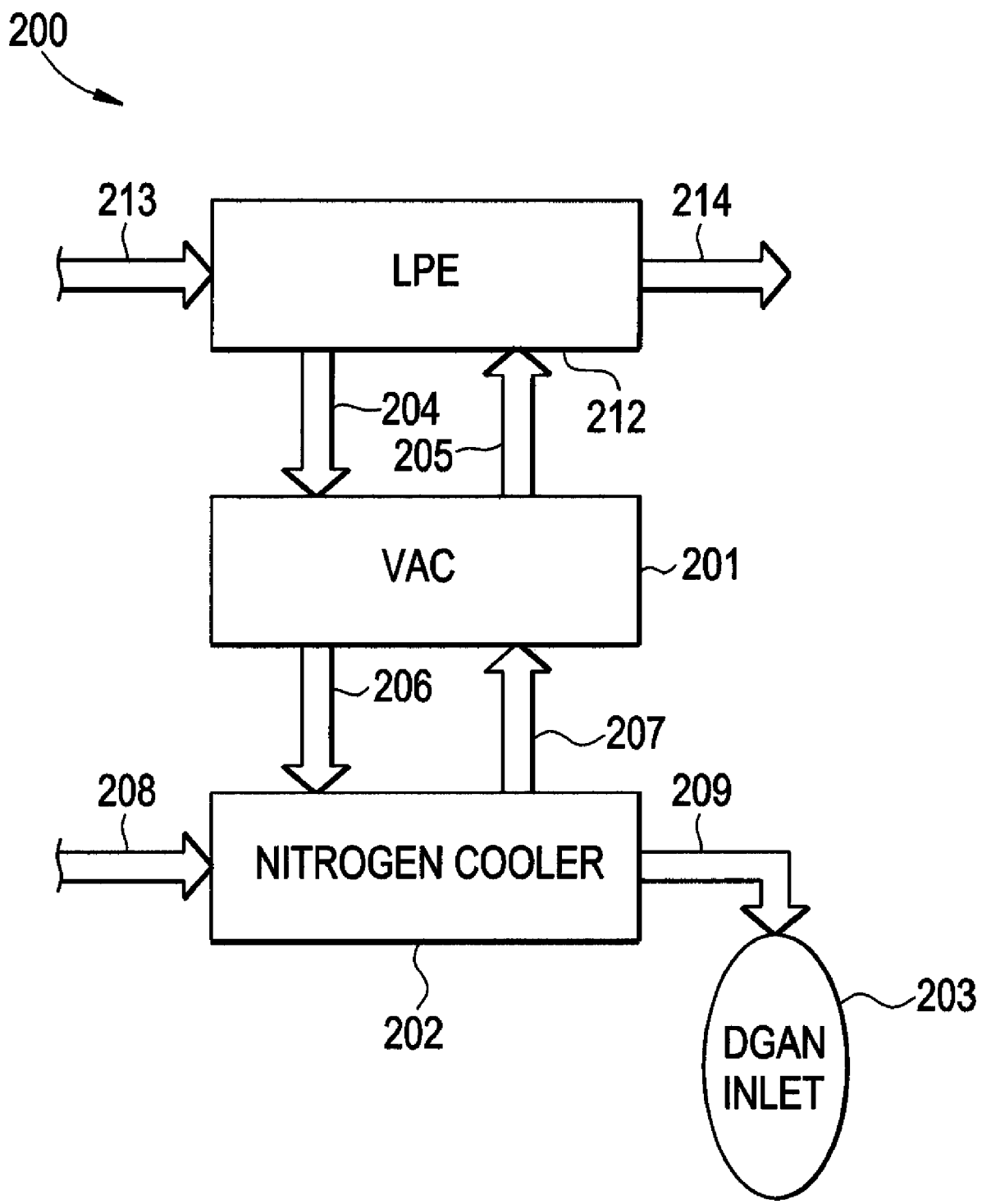
FIG. 2 is an embodiment of a DGAN compressor inlet in conjunction with a VAC.

FIG. 2 illustrates an embodiment 200 of a DGAN compressor inlet in conjunction with a VAC that is powered by water heated using stack flue gas. Stack flue gas is input to low pressure economizer (LPE) 212 via pipe 213, and flue gas is output to the stack by pipe 214. LPE 212 heats water using the stack flue gas and sends the hot water via pipe 204 to VAC 201. The VAC 201 uses the heated water received through pipe 204 to power the generator, which powers the absorber, evaporator, and condenser, as discussed above with regards to FIG. 1. Water or steam at reduced temperature is output from VAC 201 via pipe 205. The cooling media from the VAC 201 travels to and from the nitrogen cooler 202 via pipes 206 and 207. Nitrogen cooler 202 receives diluent nitrogen through pipe 208, chills the diluent nitrogen using the cooling media circulating via pipes 206 and 207, and outputs cooled diluent nitrogen to DGAN compressor inlet 203 via pipe 209.

Figure 3:
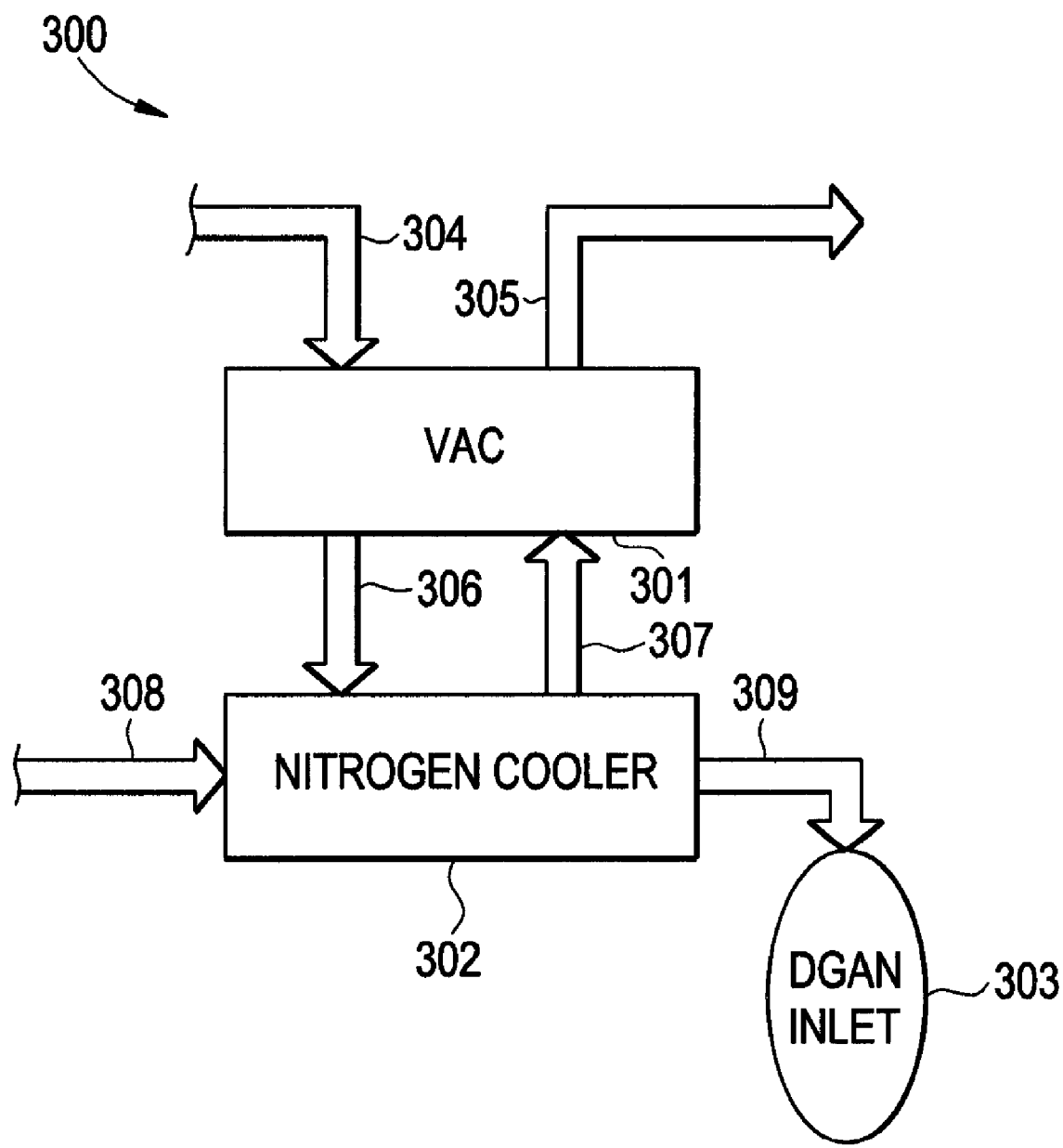
FIG. 3 is an embodiment of a DGAN compressor inlet in conjunction with a VAC.

FIG. 3 illustrates an embodiment 300 of a DGAN compressor inlet in conjunction with a VAC 301 that is powered by steam or hot water. VAC 301 receives steam or hot water through pipe 304. Pipe 304 may carry steam from, for example, an SSR outlet or hot water from an evaporator blow down flow. The steam or hot water from pipe 304 is used to power the generator, which powers the absorber, evaporator, and condenser, as discussed above with regards to FIG. 1. Water or steam at reduced temperature is output from VAC 301 via pipe 305; in embodiments that receive steam from the SSR, pipe 305 may connect to a gland seal condenser (GSC). A cooling media generated by VAC 301 travels to and from diluent nitrogen cooler 302 via pipes 306 and 307. Nitrogen cooler 302 receives nitrogen from pipe 308, cools the diluent nitrogen with the cooling media circulating via pipes 306 and 307, and outputs the cooled diluent nitrogen to DGAN compressor inlet 303 via pipe 309.

FIG. 4 illustrates an embodiment of a method 400 of cooling nitrogen supplied to a DGAN compressor inlet. In block 401, heat from a bottoming cycle heat source is used to power a VAC. In block 402, the VAC cools diluent nitrogen. In block 403, the cooled diluent nitrogen is sent to the DGAN compressor inlet.

For an example IGCC power plant, specifically, a General Electric Multi-Shaft STAG 207FB IGCC, with 2 GTs and 2 gasifiers burning Illinois Basin coal at ISO day, the initial DGAN compressor inlet temperature is about 80° F. The DGAN compressor inlet temperature may be brought down to about 64° F. by a VAC using SSR steam as a heat source, improving the power consumption of the DGAN compressor by about 1 MW, and giving an efficiency gain of about 0.08%. The DGAN compressor inlet temperature may be reduced to about 44° F. by a VAC using stack flue gas as a heat source, improving the DGAN compressor power consumption by about 1.8 MW, and giving an efficiency gain of about 0.12%. The initial investment required to install the VAC system is low compared to the savings due to efficiency improvements over the IGCC power plant's life cycle.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A diluent nitrogen compressor inlet cooling system, comprising:
    a bottoming cycle heat source;
    a vapor absorption chiller powered by the bottoming cycle heat source, the vapor absorption chiller being configured to cool diluent nitrogen; and
    a diluent nitrogen compressor that receives the cooled diluent nitrogen from the vapor absorption chiller.

2. The system of claim 1, wherein the bottoming cycle heat source comprises stack flue gas.

3. The system of claim 2, further comprising a low pressure economizer configured to heat water using the stack flue gas and provide the heated water to the vapor absorption chiller.

4. The system of claim 1, wherein the bottoming cycle heat source comprises steam from a steam seal regulator.

5. The system of claim 1, wherein the bottoming cycle heat source comprises evaporator blow down.

6. The system of claim 1, wherein the vapor absorption chiller indirectly cools the diluent nitrogen using a chilled media.

7. A method for cooling an inlet of a diluent nitrogen compressor, the method comprising:
    powering a vapor absorption chiller using a bottoming cycle heat source from the integrated gasification combined cycle system;
    cooling diluent nitrogen by the vapor absorption chiller; and
    providing the cooled diluent nitrogen to a diluent nitrogen compressor inlet.

8. The method of claim 7, wherein the bottoming cycle heat source comprises stack flue gas.

9. The method of claim 8, further comprising heating water in a low pressure economizer using the stack flue gas and providing the heated water to the vapor absorption chiller.

10. The method of claim 7, wherein the bottoming cycle heat source comprises steam from a steam seal regulator.

11. The method of claim 7, wherein the bottoming cycle heat source comprises evaporator blow down.

12. The method of claim 7, wherein cooling the diluent nitrogen comprises indirect cooling using a chilled media.

* * * * *